(12) United States Patent
Abotabl et al.

(10) Patent No.: US 12,550,225 B2
(45) Date of Patent: Feb. 10, 2026

(54) COMPONENT CARRIER ACTIVATION AND DEACTIVATION

(71) Applicant: QUALCOMM Incorporated, San Diego, CA (US)

(72) Inventors: Ahmed Attia Abotabl, San Diego, CA (US); Ahmed Omar Desouky Ali, Santa Clara, CA (US)

(73) Assignee: QUALCOMM Incorporated, San Diego, CA (US)

( * ) Notice: Subject to any disclaimer, the term of this patent is extended or adjusted under 35 U.S.C. 154(b) by 516 days.

(21) Appl. No.: 18/055,685

(22) Filed: Nov. 15, 2022

(65) Prior Publication Data

US 2024/0163961 A1 May 16, 2024

(51) Int. Cl.
*H04W 76/28* (2018.01)

(52) U.S. Cl.
CPC .................................. *H04W 76/28* (2018.02)

(58) Field of Classification Search
CPC .. H04W 76/28; H04W 52/0216; Y02D 30/70; H04L 5/0098
See application file for complete search history.

(56) References Cited

U.S. PATENT DOCUMENTS

| | | | | |
|---|---|---|---|---|
| 2014/0199982 A1* | 7/2014 | Hahn | ................ | H04W 52/0206 455/418 |
| 2017/0026948 A1* | 1/2017 | Yang | ................ | H04W 52/0209 |
| 2018/0175975 A1* | 6/2018 | Um | ................ | H04W 24/10 |
| 2020/0145922 A1* | 5/2020 | Agrawal | ............... | H04L 1/1874 |
| 2021/0352580 A1* | 11/2021 | Zhou | ................ | H04W 52/0209 |
| 2022/0279521 A1* | 9/2022 | Cui | ................ | H04W 72/1273 |
| 2022/0303904 A1* | 9/2022 | Tsai | ................ | H04W 52/0206 |
| 2023/0209463 A1* | 6/2023 | Shih | ................ | H04W 52/0216 370/311 |
| 2024/0267849 A1* | 8/2024 | Lu | ................ | H04W 52/0274 |
| 2024/0292326 A1 | 8/2024 | Muhammad et al. | | |

FOREIGN PATENT DOCUMENTS

WO 2021258089 A2 12/2021

OTHER PUBLICATIONS

3GPP TSG RAN WG1 Meeting #98; R1-1909865; Source: Ericsson; Title: Summary #3 of efficient and low latency serving cell configuration/activation/setup; Prague, Czech Republic, Aug. 26-30, 2019. (Year: 2019).*
International Search Report and Written Opinion—PCT/US2023/077656—ISA/EPO—Mar. 14, 2024.

* cited by examiner

*Primary Examiner* — Mohammed S Chowdhury
(74) *Attorney, Agent, or Firm* — Dinsmore & Shohl LLP

(57) ABSTRACT

Various aspects of the present disclosure generally relate to wireless communication. In some aspects, a user equipment (UE) may receive an indication of at least one of: a time configuration for deactivation of a cell, a deactivation type for the deactivation of the cell, or a discontinuous reception (DRX) configuration for the deactivation of the cell. The UE may receive signaling indicating to deactivate the cell. The UE may deactivate the cell in accordance with at least one of the time configuration, the deactivation type, or the DRX configuration. Numerous other aspects are described.

20 Claims, 10 Drawing Sheets

COMPONENT CARRIER ACTIVATION AND DEACTIVATION

FIELD OF THE DISCLOSURE

Aspects of the present disclosure generally relate to wireless communication and to techniques and apparatuses for component carrier activation and deactivation.

BACKGROUND

Wireless communications systems are widely deployed to provide various telecommunication services such as telephony, video, data, messaging, broadcasts, or other similar types of services. These wireless communications systems may employ multiple-access technologies capable of supporting communications with multiple users by sharing available wireless communications system resources with those users.

Although wireless communications systems have made great technological advancements over many years, challenges still exist. For example, complex and dynamic environments can still attenuate or block signals between wireless transmitters and wireless receivers. Accordingly, there is a continuous desire to improve the technical performance of wireless communications systems, including, for example: improving speed and data carrying capacity of communications, improving efficiency of the use of shared communications mediums, reducing power used by transmitters and receivers while performing communications, improving reliability of wireless communications, avoiding redundant transmissions and/or receptions and related processing, improving the coverage area of wireless communications, increasing the number and types of devices that can access wireless communications systems, increasing the ability for different types of devices to intercommunicate, increasing the number and types of wireless communications mediums available for use, and the like. Consequently, there exists a need for further improvements in wireless communications systems to overcome the aforementioned technical challenges and others.

SUMMARY

One aspect provides a method for wireless communication by a user equipment (UE). The method includes receiving an indication of at least one of: a time configuration for deactivation of a cell, a deactivation type for the deactivation of the cell, or a discontinuous reception (DRX) configuration for the deactivation of the cell; receiving signaling indicating to deactivate the cell; and deactivating the cell in accordance with at least one of the time configuration, the deactivation type, or the DRX configuration.

Another aspect provides a method for wireless communication by a network entity. The method includes outputting an indication of at least one of: a time configuration for deactivation of a cell of a UE, a deactivation type for the deactivation of the cell, or a DRX configuration for the deactivation of the cell; and outputting signaling indicating to deactivate the cell.

Other aspects provide: an apparatus operable, configured, or otherwise adapted to perform any one or more of the aforementioned methods and/or those described herein with reference to and as illustrated by the drawings and specification; a non-transitory, computer-readable media comprising instructions that, when executed by a processor of an apparatus, cause the apparatus to perform the aforementioned methods as well as those described herein with reference to and as illustrated by the drawings and specification; a computer program product embodied on a computer-readable storage medium comprising code for performing the aforementioned methods as well as those described herein with reference to and as illustrated by the drawings and specification; and/or an apparatus comprising means for performing the aforementioned methods, as well as those described herein with reference to and as illustrated by the drawings and specification. By way of example, an apparatus may comprise a processing system, a device with a processing system, or processing systems cooperating over one or more networks.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
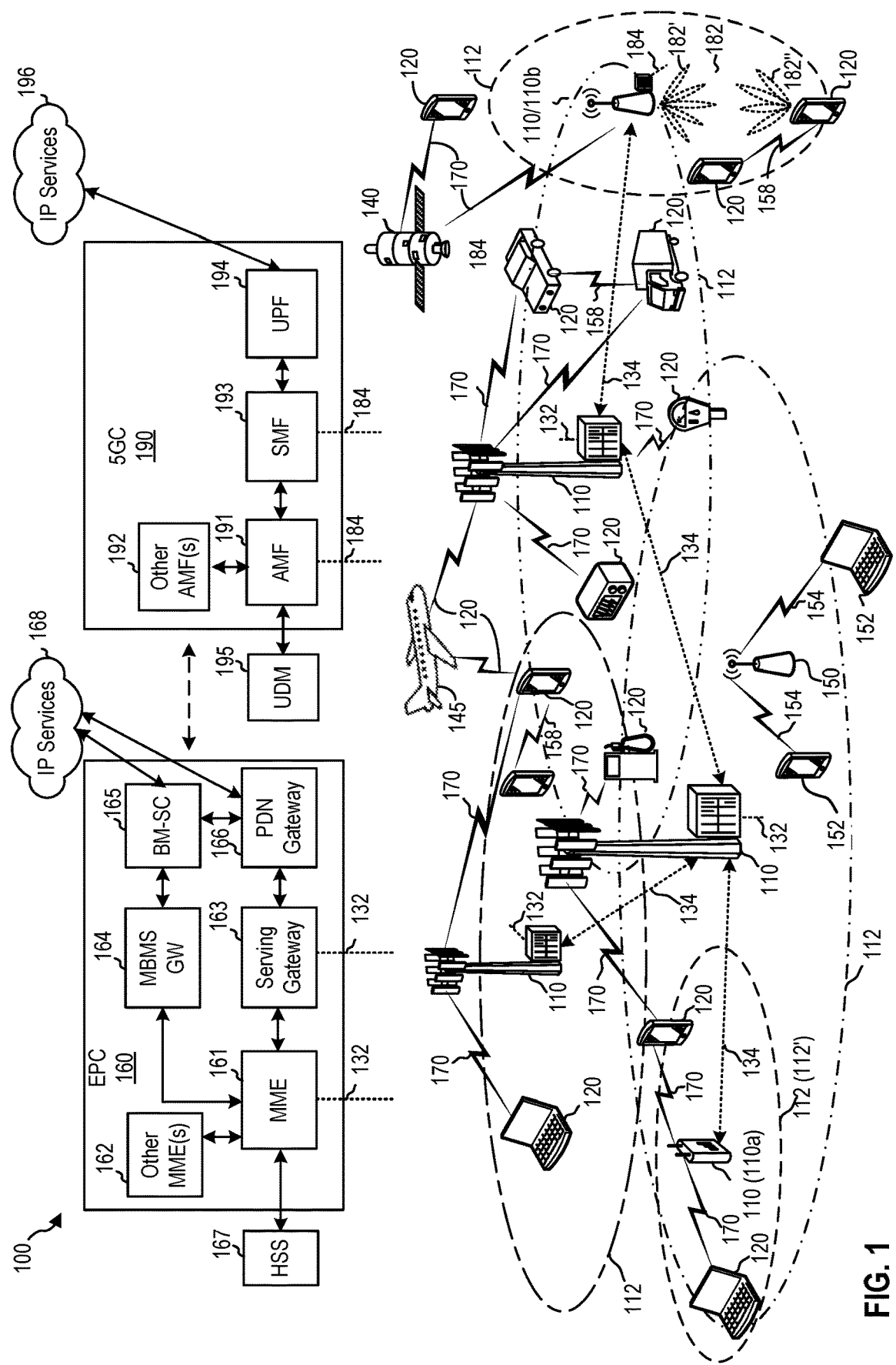
FIG. 1 depicts an example of a wireless network, in accordance with the present disclosure.

Aspects of the present disclosure provide apparatuses, methods, processing systems, and computer-readable mediums for component carrier activation and deactivation.

Telecommunication networks, such as cellular networks, consume energy. Reducing energy consumption is one way to make cellular networks more prevalent and accessible. One opportunity for energy saving occurs with respect to a user equipment (UE). In general, UEs may be configured with multiple component carriers (also referred to as "cells") that are used to transmit and receive signals from other network components. Energy can be saved by deactivating and reactivating one or more of the component carriers, particularly those that are not needed for brief periods of time. This deactivation and reactivation can be performed dynamically (e.g., using dynamic signaling such as radio resource control or downlink control information signaling that indicates to activate or deactivate a particular cell) or semi-statically (e.g., in which a schedule for activation and deactivation of a cell, or one or more energy saving states of the cell, is configured).

Frequently deactivating and reactivating component carriers can create issues, however. For example, certain configuration parameters may need to be updated when one or more component carriers are reactivated, such as an automatic gain control parameter. As another example, there may be some situations in which it is beneficial for the UE to deactivate (e.g., power down, switch to a low power mode) a radio frequency (RF) chain associated with a deactivated carrier, and other situations in which it is not beneficial for the UE to deactivate the RF chain. This is especially true for component carriers deactivated for longer periods of time.

One way for a UE to operate more efficiently and implement energy saving techniques is for the UE to receive and act on information concerning a time and/or type of deactivation. This information could include, for example, how long the component carrier will be deactivated, whether the deactivation is associated with a sleep mode, the type of capabilities affected by the deactivation, and/or the like.

Providing the foregoing information to the UE may allow the UE to address the foregoing concerns with frequent deactivation and reactivation of component carriers. For example, if the UE knows how long a component carrier will be deactivated and/or the nature of the deactivation (e.g., sleep mode, RF deactivation, baseband deactivation), the UE can decide whether to update the appropriate configuration parameters for the component carrier reactivation.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

FIG. 1 depicts an example of a wireless network 100, in accordance with the present disclosure.

Generally, wireless network 100 includes various network entities (alternatively, network elements or network nodes). A network entity is generally a communications device and/or a communications function performed by a communications device (e.g., a user equipment (UE), a base station (BS), a component of a BS, a server, etc.). For example, various functions of a network as well as various devices associated with and interacting with a network may be considered network entities. Further, wireless network 100 includes terrestrial aspects, such as ground-based network entities (e.g., BSs 110), and non-terrestrial aspects, such as satellite 140 and aircraft 145, which may include network entities on-board (e.g., one or more BSs) capable of communicating with other network elements (e.g., terrestrial BSs) and UEs.

In the depicted example, wireless network 100 includes BSs 110, UEs 120, and one or more core networks, such as an Evolved Packet Core (EPC) 160 and a 5G Core (5GC)

190, which may interoperate to provide communications services over various communications links, including wired and wireless links.

FIG. 1 depicts various example UEs 120, which may include: a cellular phone, a smart phone, a session initiation protocol (SIP) phone, a laptop, a personal digital assistant (PDA), a satellite radio, a global positioning system unit, a multimedia device, a video device, a digital audio player, a camera, a game console, a tablet, a smart device, a wearable device, a vehicle, an electric meter, a gas pump, a kitchen appliance, a healthcare device, an implant, a sensor/actuator, a display, an internet of things (IoT) device, an always on (AON) device, an edge processing device, or another device. A UE 120 may also be referred to more generally as a mobile device, a wireless device, a wireless communications device, a station, a mobile station, a subscriber station, a mobile subscriber station, a mobile unit, a subscriber unit, a wireless unit, a remote unit, a remote device, an access terminal, a mobile terminal, a wireless terminal, a remote terminal, or a handset, among other examples.

BSs 110 may wirelessly communicate with (e.g., transmit signals to or receive signals from) UEs 120 via communications links 170. The communications links 170 between BSs 110 and UEs 120 may carry uplink (UL) (also referred to as reverse link) transmissions from a UE 120 to a BS 110 and/or downlink (DL) (also referred to as forward link) transmissions from a BS 110 to a UE 120. The communications links 170 may use multiple-input and multiple-output (MIMO) antenna technology, including spatial multiplexing, beamforming, and/or transmit diversity in various aspects.

BSs 110 may generally include, for example, a NodeB, an enhanced NodeB (eNB), a next generation enhanced NodeB (ng-eNB), a next generation NodeB (gNB or gNodeB), an access point, a base transceiver station, a radio base station, a radio transceiver, a transceiver function, a transmission reception point, and/or others. A BS 110 may provide communications coverage for a respective geographic coverage area 112, which may sometimes be referred to as a cell, and which may overlap in some cases (e.g., a small cell provided by a BS 110a may have a coverage area 112' that overlaps the coverage area 112 of a macro cell). A BS may, for example, provide communications coverage for a macro cell (covering a relatively large geographic area), a pico cell (covering a relatively smaller geographic area, such as a sports stadium), a femto cell (covering a relatively smaller geographic area (e.g., a home)), and/or other types of cells.

Figure 3:
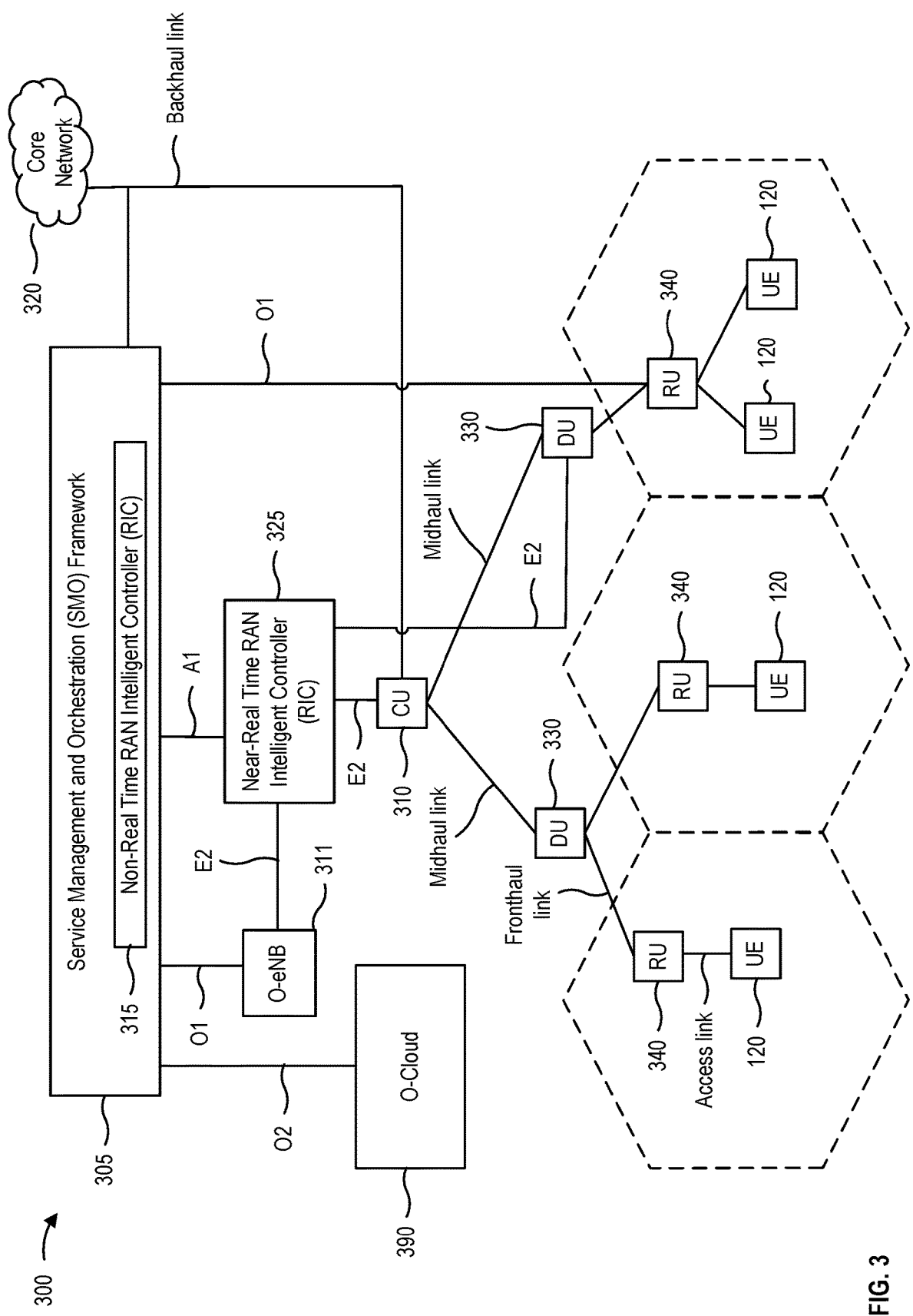
FIG. 3 depicts an example disaggregated base station architecture.

While BSs 110 are depicted in various aspects as unitary communications devices, BSs 110 may be implemented in various configurations. For example, one or more components of a base station may be disaggregated, including a central unit (CU), one or more distributed units (DUs), one or more radio units (RUs), a Near-Real Time (Near-RT) RAN Intelligent Controller (RIC), or a Non-Real Time (Non-RT) RIC, to name a few examples. In another example, various aspects of a base station may be virtualized. More generally, a base station (e.g., BS 110) may include components that are located at a single physical location or components located at various physical locations. In examples in which a base station includes components that are located at various physical locations, the various components may each perform functions such that, collectively, the various components achieve functionality that is similar to a base station that is located at a single physical location. In some aspects, a base station including components that are located at various physical locations may be referred to as a disaggregated radio access network architecture, such as an Open RAN (O-RAN) or Virtualized RAN (VRAN) architecture. FIG. 3 depicts and describes an example disaggregated base station architecture.

Different BSs 110 within wireless network 100 may also be configured to support different radio access technologies, such as 3G, 4G, and/or 5G, among other examples. For example, BSs 110 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). BSs 110 configured for 5G (e.g., 5G NR or Next Generation RAN (NG-RAN)) may interface with 5GC 190 through second backhaul links 184. BSs 110 may communicate directly or indirectly (e.g., through the EPC 160 or 5GC 190) with each other over third backhaul links 134 (e.g., X2 interfaces), which may be wired or wireless.

Wireless network 100 may subdivide the electromagnetic spectrum into various classes, bands, channels, or other features. In some aspects, the subdivision is provided based on wavelength and frequency, where frequency may also be referred to as a carrier, a subcarrier, a frequency channel, a tone, or a subband. For example, 3GPP currently defines Frequency Range 1 (FR1) as including 410 megahertz (MHz)-7125 MHz, which is often referred to (interchangeably) as "Sub-6 GHz". Similarly, 3GPP currently defines Frequency Range 2 (FR2) as including 24,250 MHz-52,600 MHz, which is sometimes referred to (interchangeably) as a "millimeter wave" ("mmW" or "mmWave"). A base station configured to communicate using mmWave or near mmWave radio frequency bands (e.g., a mmWave base station such as BS 110b) may utilize beamforming (e.g., as shown by 182) with a UE (e.g., 120) to improve path loss and range.

The communications links 170 between BSs 110 and, for example, UEs 120, may use one or more carriers, which may have different bandwidths (e.g., 5 MHz, 10 MHz, 15 MHz, 20 MHz, 100 MHz, 400 MHz, and/or other bandwidths), and which may be aggregated in various aspects. Carriers may or may not be adjacent to each other in frequency. In some examples, allocation of carriers may be asymmetric with respect to DL and UL (e.g., more or fewer carriers may be allocated for DL than for UL).

Communications using higher frequency bands may have higher path loss and a shorter range compared to lower frequency communications. Accordingly, certain base stations (e.g., base station 110b in FIG. 1) may utilize beamforming with a UE 120 to improve path loss and range, as shown at 182. For example, BS 110b and the UE 120 may each include a plurality of antennas, such as antenna elements, antenna panels, and/or antenna arrays to facilitate the beamforming. In some cases, BS 110b may transmit a beamformed signal to UE 120 in one or more transmit directions 182'. UE 120 may receive the beamformed signal from the BS 110b in one or more receive directions 182". UE 120 may also transmit a beamformed signal to the BS 110b in one or more transmit directions 182". BS 110b may also receive the beamformed signal from UE 120 in one or more receive directions 182'. BS 110b and UE 120 may then perform beam training to determine the best receive and transmit directions for each of BS 110b and UE 120. Notably, the transmit and receive directions for BS 110b may or may not be the same. Similarly, the transmit and receive directions for UE 120 may or may not be the same.

Wireless network 100 may include a Wi-Fi AP 150 in communication with Wi-Fi stations (STAs) 152 (e.g., UEs 120) via communications links 154 in, for example, a 2.4 GHz and/or 5 GHz unlicensed frequency spectrum.

Certain UEs 120 may communicate with each other using device-to-device (D2D) communications link 158. D2D communications link 158 may use one or more sidelink channels, such as a physical sidelink broadcast channel (PSBCH), a physical sidelink discovery channel (PSDCH), a physical sidelink shared channel (PSSCH), a physical sidelink control channel (PSCCH), and/or a physical sidelink feedback channel (PSFCH).

EPC 160 may include various functional components, including: a Mobility Management Entity (MME) 161, other MMEs 162, a Serving Gateway 163, a Multimedia Broadcast Multicast Service (MBMS) Gateway 164, a Broadcast Multicast Service Center (BM-SC) 165, and/or a Packet Data Network (PDN) Gateway 166, such as in the depicted example. MME 161 may be in communication with a Home Subscriber Server (HSS) 167. MME 161 is the control node that processes the signaling between the UEs 120 and the EPC 160. Generally, MME 161 provides bearer and connection management.

User Internet protocol (IP) packets may be transferred through Serving Gateway 163, which is connected to PDN Gateway 166. PDN Gateway 166 provides UE IP address allocation as well as other functions. PDN Gateway 166 and the BM-SC 165 are connected to IP Services 168, which may include, for example, the Internet, an intranet, an IP Multimedia Subsystem (IMS), a Packet Switched (PS) streaming service, and/or other IP services.

BM-SC 165 may provide functions for MBMS user service provisioning and delivery. BM-SC 165 may serve as an entry point for content provider MBMS transmission, may be used to authorize and initiate MBMS Bearer Services within a public land mobile network (PLMN), and/or may be used to schedule MBMS transmissions. MBMS Gateway 164 may be used to distribute MBMS traffic to the BSs 110 belonging to a Multicast Broadcast Single Frequency Network (MBSFN) area broadcasting a particular service, and/or may be responsible for session management (e.g., session start/stop) and for collecting eMBMS related charging information.

5GC 190 may include various functional components, including: an Access and Mobility Management Function (AMF) 191, other AMFs 192, a Session Management Function (SMF) 193, and a User Plane Function (UPF) 194. AMF 191 may be in communication with Unified Data Management (UDM) 195.

AMF 191 is a control node that processes signaling between UEs 120 and 5GC 190. AMF 191 provides, for example, quality of service (QoS) flow and session management.

IP packets are transferred through UPF 194, which is connected to the IP Services 196, and which provides UE IP address allocation as well as other functions for 5GC 190. IP Services 196 may include, for example, the Internet, an intranet, an IMS, a PS streaming service, and/or other IP services.

In various aspects, a network entity or network node can be implemented as an aggregated base station, a disaggregated base station, a component of a base station, an integrated access and backhaul (IAB) node, a relay node, a sidelink node, or a transmission reception point (TRP), to name a few examples.

As indicated above, FIG. 1 is provided as an example. Other examples may differ from what is described with regard to FIG. 1.

Figure 2:
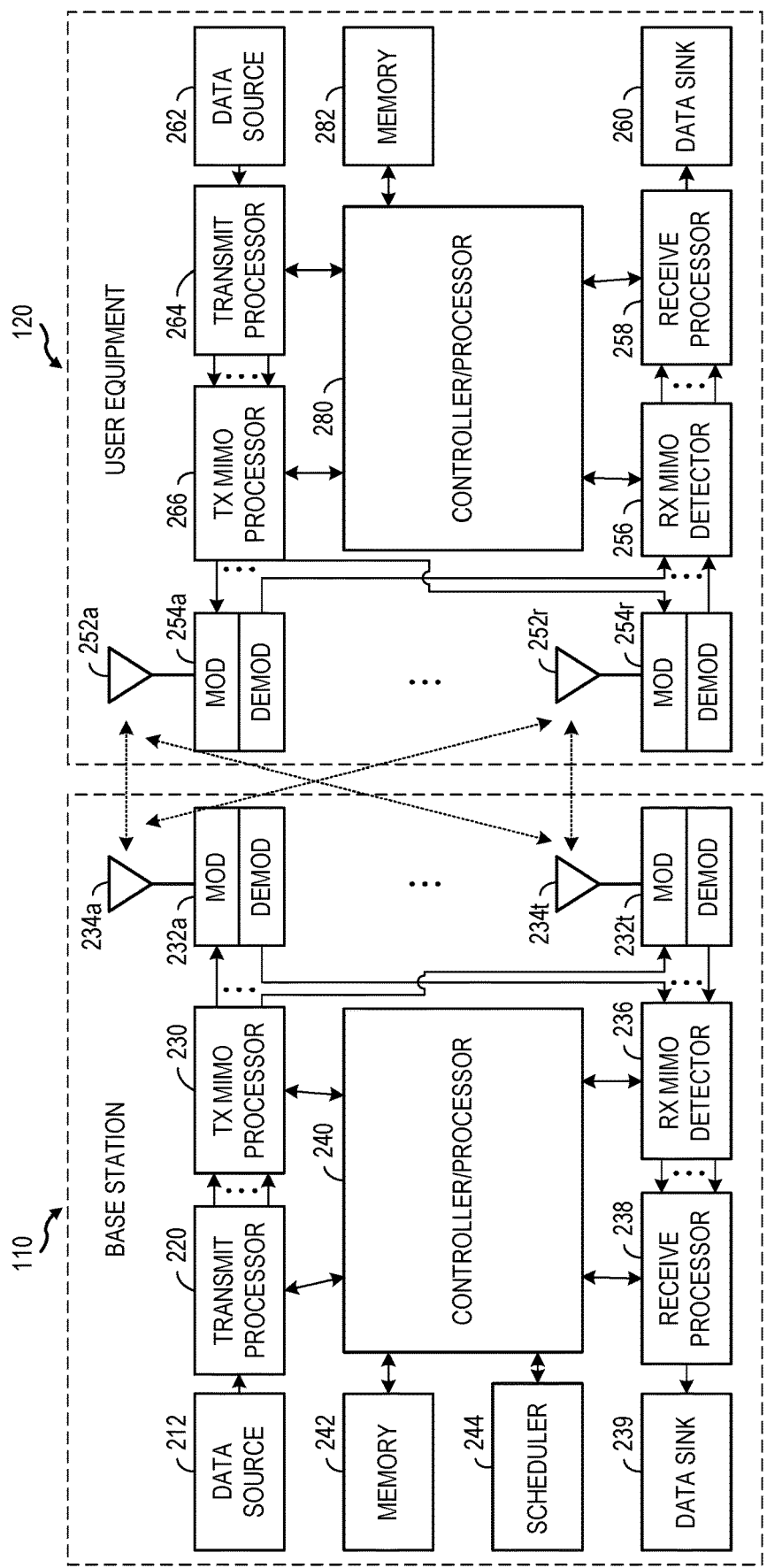
FIG. 2 depicts aspects of an example base station (BS) and user equipment (UE), in accordance with the present disclosure.

FIG. 2 depicts aspects of an example BS 110 and UE 120, in accordance with the present disclosure.

BS 110 includes various processors (e.g., 220, 230, 238, and 240), antennas 234a-t (collectively 234), transceivers 232a-t (collectively 232), which include modulators and demodulators, and other aspects, which enable wireless transmission of data (e.g., data source 212) and wireless reception of data (e.g., data sink 239). For example, BS 110 may send and receive data between BS 110 and UE 120. BS 110 includes controller/processor 240, which may be configured to implement various functions described herein related to wireless communications.

UE 120 includes various processors (e.g., 258, 264, 266, and 280), antennas 252a-r (collectively 252), transceivers 254a-r (collectively 254), which include modulators and demodulators, and other aspects, which enable wireless transmission of data (e.g., retrieved from data source 262) and wireless reception of data (e.g., provided to data sink 260). UE 120 includes controller/processor 280, which may be configured to implement various functions described herein related to wireless communications.

For an example downlink transmission, BS 110 includes a transmit processor 220 that may receive data from a data source 212 and control information from a controller/processor 240. The control information may be for the physical broadcast channel (PBCH), physical control format indicator channel (PCFICH), physical hybrid automatic repeat request (HARD) indicator channel (PHICH), physical downlink control channel (PDCCH), group common PDCCH (GC PDCCH), and/or others. The data may be for the physical downlink shared channel (PDSCH), in some examples.

Transmit processor 220 may process (e.g., encode and symbol map) the data and control information to obtain data symbols and control symbols, respectively. Transmit processor 220 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) in transceivers 232a-232t. Each modulator in transceivers 232a-232t may process a respective output symbol stream to obtain an output sample stream. Each modulator may further process (e.g., convert to analog, amplify, filter, and upconvert) the output sample stream to obtain a downlink signal. Downlink signals from the modulators in transceivers 232a-232t may be transmitted via the antennas 234a-234t, respectively.

In order to receive the downlink transmission, UE 120 includes antennas 252a-252r that may receive the downlink signals from the BS 110 and may provide received signals to the demodulators (DEMODs) in transceivers 254a-254r, respectively. Each demodulator in transceivers 254a-254r may condition (e.g., filter, amplify, downconvert, and digitize) a respective received signal to obtain input samples. Each demodulator may further process the input samples to obtain received symbols.

MIMO detector 256 may obtain received symbols from all the demodulators in transceivers 254a-254r, perform MIMO detection on the received symbols if applicable, and provide detected symbols. Receive processor 258 may process (e.g., demodulate, deinterleave, and decode) the detected symbols, provide decoded data for the UE 120 to a data sink 260, and provide decoded control information to a controller/processor 280.

For an example uplink transmission, UE 120 further includes a transmit processor 264 that may receive and process data (e.g., for the physical uplink shared channel (PUSCH)) from a data source 262 and control information (e.g., for the physical uplink control channel (PUCCH)) from the controller/processor 280. Transmit processor 264 may also generate reference symbols for a reference signal (e.g., for the sounding reference signal (SRS)). The symbols from the transmit processor 264 may be precoded by a TX MIMO processor 266 if applicable, further processed by the modulators in transceivers 254a-254r (e.g., for SC-FDM), and transmitted to BS 110.

At BS 110, the uplink signals from UE 120 may be received by antennas 234a-t, processed by the demodulators in transceivers 232a-232t, detected by a MIMO detector 236 if applicable, and further processed by a receive processor 238 to obtain decoded data and control information sent by UE 120. Receive processor 238 may provide the decoded data to a data sink 239 and the decoded control information to the controller/processor 240. Memories 242 and 282 may store data and program codes for BS 110 and UE 120, respectively. Scheduler 244 may schedule UEs for data transmission on the downlink and/or uplink.

In various aspects, BS 110 may be described as transmitting and receiving various types of data associated with the methods described herein. In these contexts, "transmitting" may refer to various mechanisms of outputting data, such as outputting data from data source 212, scheduler 244, memory 242, transmit processor 220, controller/processor 240, TX MIMO processor 230, transceivers 232a-t, antenna 234a-t, and/or other aspects described herein. Similarly, "receiving" may refer to various mechanisms of obtaining data, such as obtaining data from antennas 234a-t, transceivers 232a-t, RX MIMO detector 236, controller/processor 240, receive processor 238, scheduler 244, memory 242, and/or other aspects described herein.

In various aspects, UE 120 may likewise be described as transmitting and receiving various types of data associated with the methods described herein. In these contexts, "transmitting" may refer to various mechanisms of outputting data, such as outputting data from data source 262, memory 282, transmit processor 264, controller/processor 280, TX MIMO processor 266, transceivers 254a-t, antenna 252a-t, and/or other aspects described herein. Similarly, "receiving" may refer to various mechanisms of obtaining data, such as obtaining data from antennas 252a-t, transceivers 254a-t, RX MIMO detector 256, controller/processor 280, receive processor 258, memory 282, and/or other aspects described herein.

In some aspects, a processor may be configured to perform various operations, such as those associated with the methods described herein, and transmit (output) to or receive (obtain) data from another interface that is configured to transmit or receive, respectively, the data.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an eNB, an NR BS, a 5G NB, an AP, a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network entity) may be configured to utilize a radio protocol stack that is physically or logically integrated within a single RAN node (e.g., within a single device or unit). A disaggregated base station (e.g., a disaggregated network entity) may be configured to utilize a protocol stack that is physically or logically distributed among two or more units (such as one or more CUs, one or more DUs, or one or more RUs). In some examples, a CU may be implemented within a network entity, and one or more DUs may be co-located with the CU, or alternatively, may be geographically or virtually distributed throughout one or multiple other network nodes. The DUs may be implemented to communicate with one or more RUs. Each of the CU, DU, and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

FIG. 3 depicts an example disaggregated base station 300 architecture. The disaggregated base station 300 architecture may include one or more CUs 310 that can communicate directly with a core network 320 via a backhaul link, or indirectly with the core network 320 through one or more disaggregated base station units (such as a Near-Real Time (Near-RT) RAN Intelligent Controller (MC) 325 via an E2 link, or a Non-Real Time (Non-RT) MC 315 associated with a Service Management and Orchestration (SMO) Framework 305, or both). A CU 310 may communicate with one or more DUs 330 via respective midhaul links, such as an F1 interface. The DUs 330 may communicate with one or more RUs 340 via respective fronthaul links. The RUs 340 may communicate with respective UEs 120 via one or more RF access links. In some implementations, the UE 120 may be simultaneously served by multiple RUs 340.

Each of the units (e.g., the CUs 310, the DUs 330, the RUs 340, as well as the Near-RT RICs 325, the Non-RT RICs 315 and the SMO Framework 305) may include one or more interfaces or be coupled to one or more interfaces configured to receive or transmit signals, data, or information (collectively, signals) via a wired or wireless transmission medium. Each of the units, or an associated processor or controller providing instructions to the communications interfaces of the units, can be configured to communicate with one or more of the other units via the transmission medium. For example, the units can include a wired interface configured to receive or transmit signals over a wired transmission medium to one or more of the other units. Additionally or alternatively, the units can include a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 310. The CU 310 may be configured to handle user plane functionality (e.g., Central Unit-User Plane (CU-UP)), control plane functionality (e.g., Central Unit-Control Plane (CU-CP)), or a combination thereof. In some implementations, the CU 310 can be logically split into one or more CU-UP units and one or more CU-CP units. The CU-UP unit can communicate bidirectionally with the CU-CP unit via an interface, such as the E1 interface when implemented in an O-RAN configuration. The CU 310 can be implemented to communicate with the distributed unit (DU) 330, as necessary, for network control and signaling.

The DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3rd Generation Partnership Project (3GPP). In some aspects, the DU 330 may further host one or more low PHY layers. Each layer (or module) can be implemented with an interface configured to communicate signals with other layers (and modules) hosted by the DU 330, or with the control functions hosted by the CU 310.

Lower-layer functionality can be implemented by one or more RUs 340. In some deployments, an RU 340, controlled by a DU 330, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 340 can be implemented to handle over-the-air (OTA) communications with one or more UEs 120. In some implementations, real-time and non-real-time aspects of control and user plane communications with the RU(s) 340 can be controlled by the corresponding DU 330. In some scenarios, this configuration can enable the DU(s) 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements which may be managed via an operations and maintenance interface (such as an O1 interface). For virtualized network elements, the SMO Framework 305 may be configured to interact with a cloud computing platform (such as an open cloud (O-Cloud) 390) to perform network element life cycle management (such as to instantiate virtualized network elements) via a cloud computing platform interface (such as an O2 interface). Such virtualized network elements can include, but are not limited to, CUs 310, DUs 330, RUs 340, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with one or more RUs 340 via an O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, artificial intelligence/machine learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via O1) or via creation of RAN management policies (such as A1 policies).

As indicated above, FIG. 3 is provided as an example. Other examples may differ from what is described with regard to FIG. 3.

Figure 4:
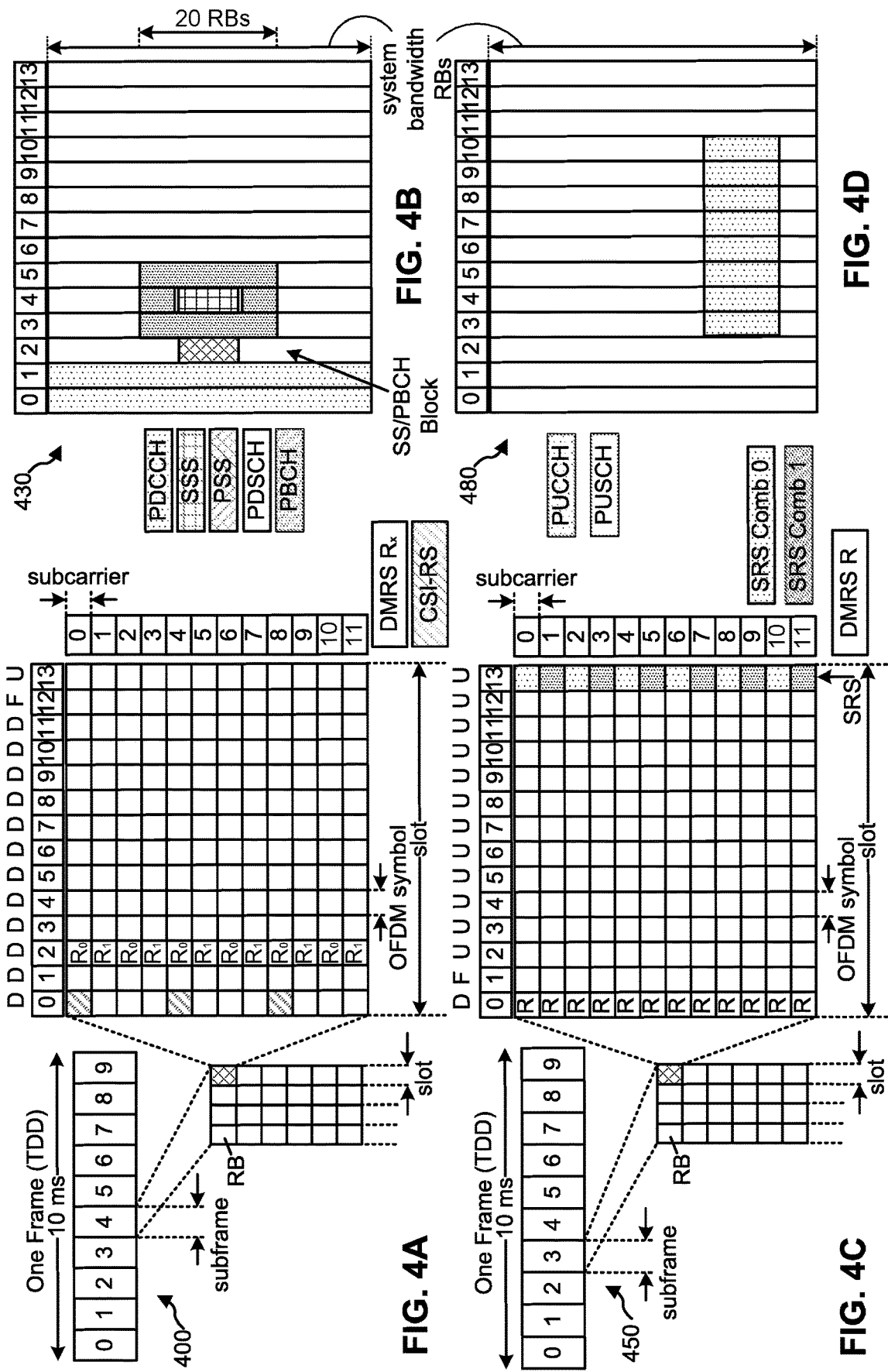
FIGS. 4A, 4B, 4C, and 4D depict aspects of data structures for a wireless communications network, such as wireless network of FIG. 1, in accordance with the present disclosure.

FIGS. 4A, 4B, 4C, and 4D depict aspects of data structures for a wireless communications network, such as wireless network 100 of FIG. 1, in accordance with the present disclosure. FIG. 4A is a diagram 400 illustrating an example of a first subframe within a 5G (e.g., 5G NR) frame structure, FIG. 4B is a diagram 430 illustrating an example of DL channels within a 5G subframe, FIG. 4C is a diagram 450 illustrating an example of a second subframe within a 5G frame structure, and FIG. 4D is a diagram 480 illustrating an example of UL channels within a 5G subframe.

Wireless communications systems may utilize orthogonal frequency division multiplexing (OFDM) with a cyclic prefix (CP) on the uplink and downlink. Such systems may also support half-duplex operation using time division duplexing (TDD). OFDM and single-carrier frequency division multiplexing (SC-FDM) partition the system bandwidth (e.g., as depicted in FIGS. 4B and 4D) into multiple orthogonal subcarriers. Each subcarrier may be modulated with data. Modulation symbols may be sent in the frequency domain with OFDM and/or in the time domain with SC-FDM.

A wireless communications frame structure may be frequency division duplex (FDD), in which, for a particular set of subcarriers, subframes within the set of subcarriers are dedicated for either DL or UL. Wireless communications frame structures may also be time division duplex (TDD), in which, for a particular set of subcarriers, subframes within the set of subcarriers are dedicated for both DL and UL.

In FIGS. 4A and 4C, the wireless communications frame structure is TDD where D is DL, U is UL, and F is flexible for use between DL/UL. UEs may be configured with a slot format through a received slot format indicator (SFI) (dynamically through DL control information (DCI), or semi-statically/statically through RRC signaling). In the depicted examples, a 10 ms frame is divided into 10 equally sized 1 ms subframes. Each subframe may include one or more time slots. In some examples, each slot may include 7 or 14 symbols, depending on the slot format. Subframes may also include mini-slots, which generally have fewer symbols than an entire slot. Other wireless communications technologies may have a different frame structure and/or different channels.

In certain aspects, the number of slots within a subframe is based on a slot configuration and a numerology. For example, for slot configuration 0, different numerologies (µ) 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology µ, there are 14 symbols/slot and $2^\mu$ slots/subframe. The subcarrier spacing and symbol length/duration are a function of the numerology. The subcarrier spacing may be equal to $2^\mu \times 15$ kHz, where µ is the numerology index, which may be selected from values 0 to 5. Accordingly, the numerology µ=0 has a subcarrier spacing of 15 kHz and the numerology µ=5 has a subcarrier spacing of 480 kHz. Other numerologies and subcarrier spacings may be used. The symbol length/duration is inversely related to the subcarrier spacing. FIGS. 4A, 4B, 4C, and 4D provide an example of slot configuration 0 with 14 symbols per slot and numerology µ=2 with 4 slots per subframe. The slot duration is 0.25 ms, the subcarrier spacing is 60 kHz, and the symbol duration is approximately 16.67 µs.

As depicted in FIGS. 4A, 4B, 4C, and 4D, a resource grid may be used to represent the frame structure. Each time slot includes a resource block (RB) (also referred to as physical RBs (PRBs)) that extends, for example, 12 consecutive subcarriers. The resource grid is divided into multiple resource elements (REs). The number of bits carried by each RE depends on the modulation scheme.

As illustrated in FIG. 4A, some of the REs carry reference (pilot) signals (RSs) for a UE (e.g., UE 120). The RSs may include demodulation RSs (DMRSs) and/or channel state information reference signals (CSI-RSs) for channel estimation at the UE. The RSs may also include beam measurement RSs (BRSs), beam refinement RSs (BRRSs), and/or phase tracking RSs (PT-RSs).

FIG. 4B illustrates an example of various DL channels within a subframe of a frame. The physical downlink control channel (PDCCH) carries DCI within one or more control channel elements (CCEs), each CCE including, for example, nine RE groups (REGs), each REG including, for example, four consecutive REs in an OFDM symbol.

A primary synchronization signal (PSS) may be within symbol 2 of particular subframes of a frame. The PSS is used by a UE (e.g., UE 120) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DMRSs. The physical broadcast channel (PBCH), which carries a master information block (MIB), may be logically grouped with the PSS and SSS to form a synchronization signal (SS)/PBCH block (SSB). The MIB provides a number of RBs in the system bandwidth and a system frame number (SFN). The physical downlink shared channel (PDSCH) carries user data, broadcast system information not transmitted through the PBCH such as system information blocks (SIBs), and/or paging messages.

As illustrated in FIG. 4C, some of the REs carry DMRSs (indicated as R for one particular configuration, but other DMRS configurations are possible) for channel estimation at the base station. The UE may transmit DMRSs for the PUCCH and DMRSs for the PUSCH. The PUSCH DMRSs may be transmitted, for example, in the first one or two symbols of the PUSCH. The PUCCH DMRSs may be transmitted in different configurations depending on whether short or long PUCCHs are transmitted and depending on the particular PUCCH format used. UE 120 may transmit sounding reference signals (SRSs). The SRSs may be transmitted, for example, in the last symbol of a subframe. The SRSs may have a comb structure, and a UE may transmit SRSs on one of the combs. The SRSs may be used by a base station for channel quality estimation to enable frequency-dependent scheduling on the UL.

FIG. 4D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 5:
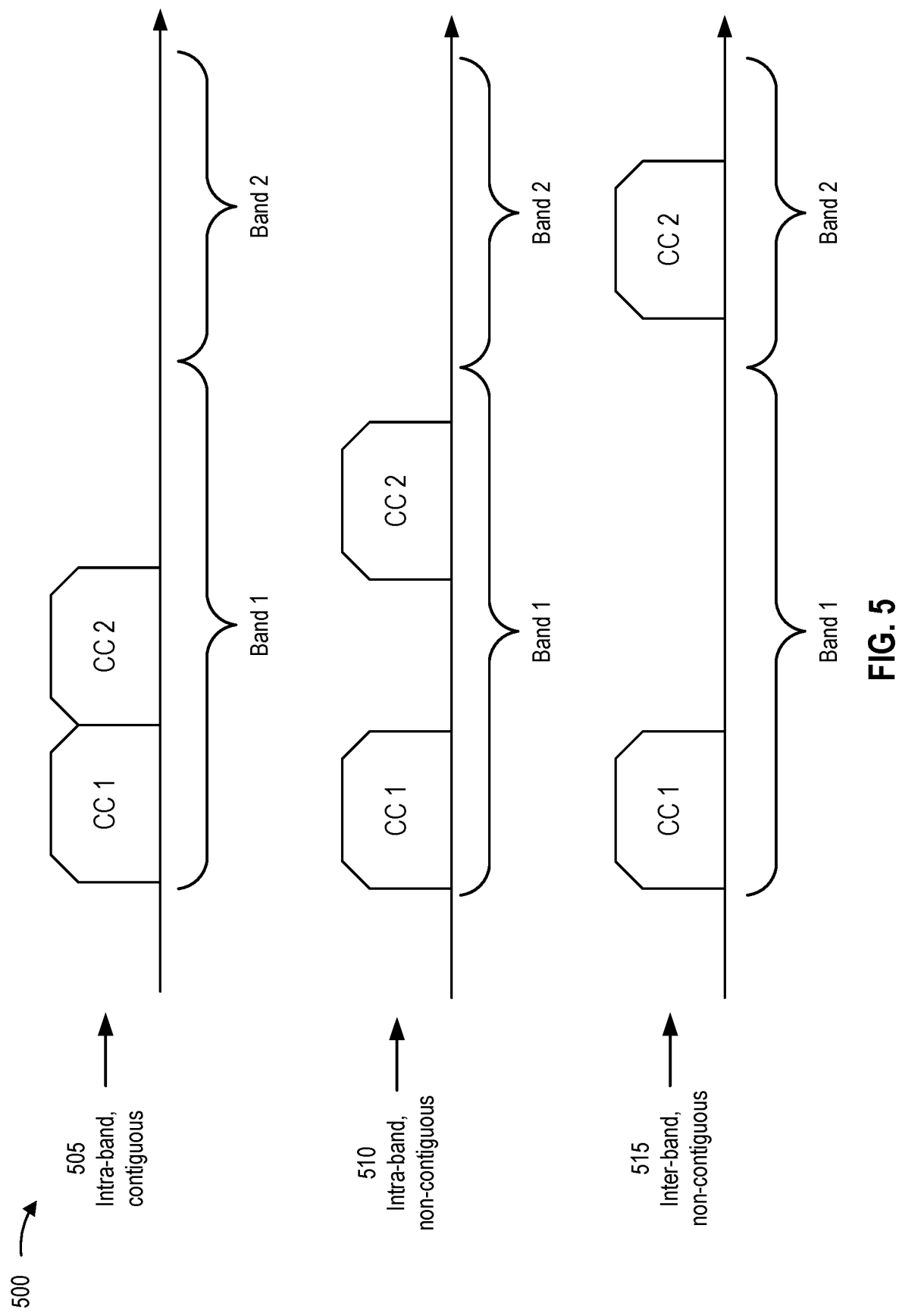
FIG. 5 is a diagram illustrating examples of carrier aggregation, in accordance with the present disclosure.

FIG. 5 is a diagram illustrating examples 500 of carrier aggregation, in accordance with the present disclosure.

Carrier aggregation is a technology that enables two or more component carriers (CCs, sometimes referred to as carriers or cells) to be combined (e.g., into a single channel) for a single UE 120 to enhance data capacity. As shown, carriers can be combined in the same or different frequency bands. Additionally, or alternatively, contiguous or non-contiguous carriers can be combined. A network node 110 may configure carrier aggregation for a UE 120, such as in an RRC message, DCI, and/or another signaling message.

As shown by reference number 505, in some aspects, carrier aggregation may be configured in an intra-band contiguous mode where the aggregated carriers are contiguous to one another and are in the same band. As shown by reference number 510, in some aspects, carrier aggregation may be configured in an intra-band non-contiguous mode where the aggregated carriers are non-contiguous to one another and are in the same band. As shown by reference number 515, in some aspects, carrier aggregation may be configured in an inter-band non-contiguous mode where the aggregated carriers are non-contiguous to one another and are in different bands.

In carrier aggregation, a UE 120 may be configured with a primary carrier or primary cell (PCell) and one or more secondary carriers or secondary cells (SCells). In some aspects, the primary carrier may carry control information (e.g., downlink control information and/or scheduling information) for scheduling data communications on one or more secondary carriers, which may be referred to as cross-carrier scheduling. In some aspects, a carrier (e.g., a primary carrier or a secondary carrier) may carry control information for scheduling data communications on the carrier, which may be referred to as self-carrier scheduling or carrier self-scheduling.

In some examples, a CC can be dynamically activated or deactivated, or switched into or out of a network energy saving state, as described in more detail below. In some examples, "dynamic deactivation" may include disabling communication on the CC such that the UE 120 does not receive or transmit communications, including reference signaling, on the CC. In some examples, a network energy saving state may indicate a deactivated state, a reduced number of antennas, a decreased transmit power, a decreased amount of reference signaling, or the like. In some examples, a network entity may dynamically deactivate a CC so that the network entity can power down (or reduce power consumption of) an RU that provides the CC for the UE 120. For example, in some cases, dynamic deactivation may be characterized by a shutdown of one or more radio resources (e.g., an RU, an antenna panel) that provide a CC, whereas "non-dynamic" deactivation (such as deactivation of a CC via DCI, not in the context of network energy savings) may be characterized by the one or more radio resources continuing to operate, such that reference signaling can continue to be transmitted on the CC. It should be noted that dynamic deactivation of a CC and/or indication of a network energy saving state can be achieved using DCI signaling, RRC signaling, a combination thereof, or another form of signaling (e.g., configuration of a semi-static schedule for dynamic activation and/or deactivation and/or network energy saving states). It should also be noted that the techniques described herein can be applied for dynamic activation/deactivation and for non-dynamic activation/deactivation. As used herein, "activation" and "deactivation," in the context of a CC, can refer to dynamic activation/deactivation or to non-dynamic activation/deactivation. The term "activation/deactivation" may refer to the operations that result in the CC becoming activated, operations that result in the CC becoming deactivated, operations that result in the CC becoming reactivated, and/or a combination thereof.

As indicated above, FIG. 5 is provided as an example. Other examples may differ from what is described with regard to FIG. 5.

Cells may be deactivated (e.g., dynamically deactivated) to reduce network energy consumption. Dynamically deactivating cells can introduce issues, however. For example, the UE may not know whether certain configuration parameters, such as automatic gain control (AGC) parameters, should be updated upon cell reactivation. The AGC parameters are used to regulate received signal strength. Failing to update the AGC parameters may result in undesirable effects such as amplifying noise, clipping received signals, and/or the like, which may inhibit the ability of the UE to function properly. As another example, there may be some situations in which it is beneficial for the UE to deactivate (e.g., power down, switch to a low power mode) an RF chain associated with a deactivated carrier, and other situations in which it is not beneficial for the UE to deactivate the RF chain. For example, it may be beneficial for the UE to deactivate the RF chain when the carrier will be deactivated for longer periods of time.

Some techniques described herein provide an indication of at least one of a time configuration for deactivation of a cell, a deactivation type for the deactivation of the cell, or a discontinuous reception (DRX) configuration for the deactivation of the cell; receiving signaling indicating to deactivate the cell; and deactivating the cell in accordance with at least one of the time configuration, the deactivation type, or the DRX configuration. With the time configuration, the deactivation type, and/or the DRX configuration, the UE can plan for the deactivation and reactivation of the cell. For example, the UE can determine whether to update certain configuration parameters based on the duration of the deactivation, the type of deactivation, and/or the like. Thus, the UE may avoid issues with amplifying noise, clipping received signals, and/or the like.

Some techniques described herein include a network entity outputting an indication of at least one of: a time configuration for deactivation of a cell of a UE, a deactivation type for the deactivation of the cell, or a DRX configuration for the deactivation of the cell; and outputting signaling indicating to deactivate the cell. By communicating the time configuration, the deactivation type, and/or the DRX configuration to the UE, the network entity may increase the likelihood that the UE can facilitate frequent deactivation and reactivation of the cell, thereby resulting in decreased energy consumption, without adversely affecting operation of the UE.

Figure 6:
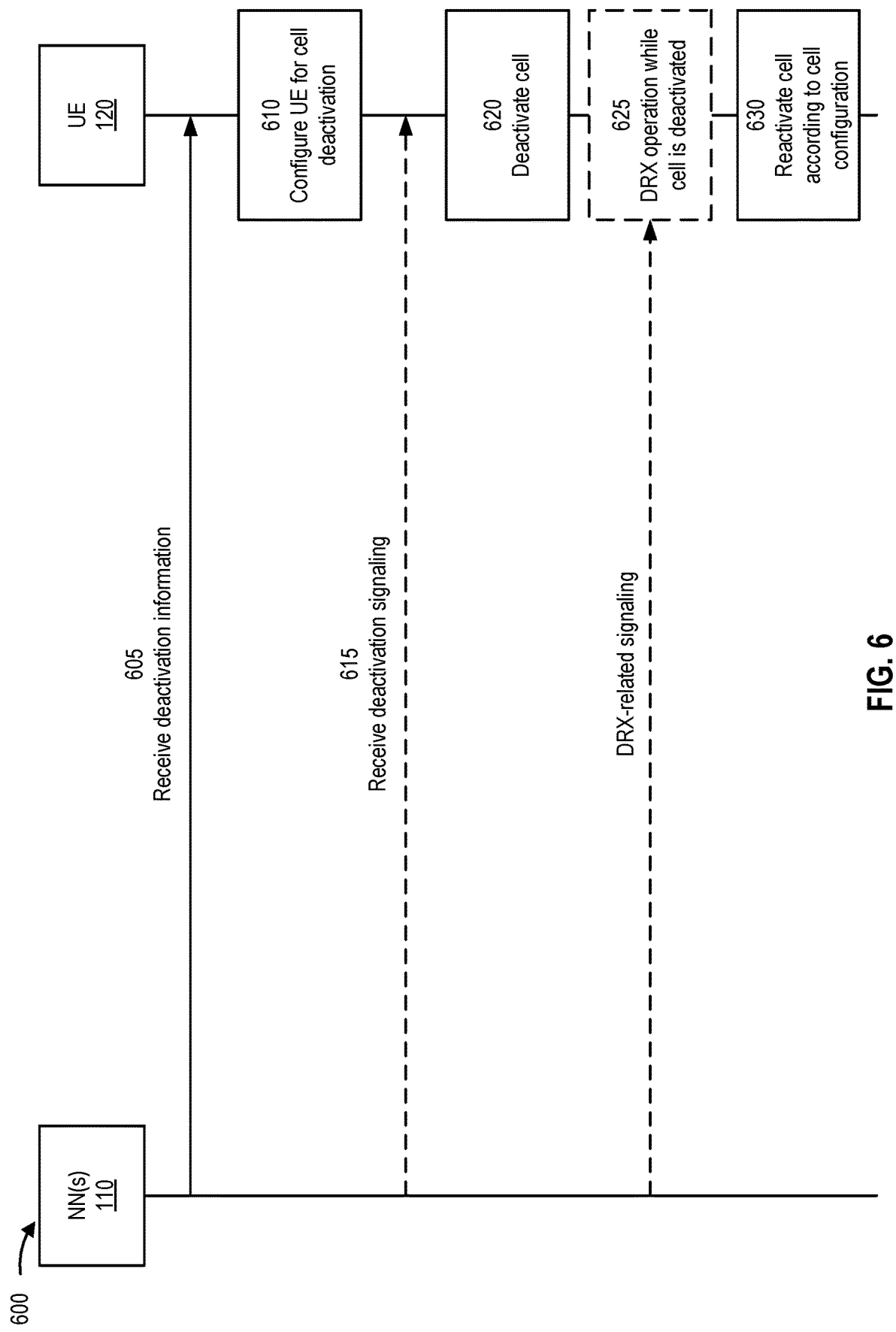
FIG. 6 is a diagram of an example associated with component carrier activation and deactivation, in accordance with the present disclosure.

FIG. 6 is a diagram of an example 600 associated with component carrier activation and deactivation, in accordance with the present disclosure. As shown in FIG. 6, a network entity (e.g., network node 110, a CU, a DU, and/or an RU) may communicate with user equipment (e.g., UE 120). In some aspects, the network entity and the UE may be part of a wireless network (e.g., wireless network 100). In some aspects, the UE and the network entity may have established a wireless connection (e.g., an RRC connection) prior to operations shown in FIG. 6. The activation and deactivation of the cell described with regard to FIG. 6 can be implemented for dynamic activation/deactivation, non-dynamic activation/deactivation, or indication of activation or deactivation of a network energy saving state, as described elsewhere herein.

As shown by reference number 605, the network entity may output, and the UE may receive, deactivation information. The deactivation information may include a time configuration, a deactivation type, a DRX configuration, a combination thereof, and/or the like. In some aspects, the time configuration may indicate a time at which the cell is to be deactivated. In some aspects, the time configuration may indicate a length of time for which the cell is to be deactivated. After the length of time, the UE may assume that the cell is activated. In some aspects, the time configuration may indicate a minimum amount of time that the cell is to remain deactivated. In such situations, the UE may assume the cell will not be reactivated before the minimum amount of time has elapsed.

In some aspects, the deactivation type may indicate a deactivation mode such as an RF deactivation (i.e., deactivating certain RF operations) and/or a baseband deactivation (i.e., deactivating certain baseband operations). In some aspects, the deactivation type may indicate that the network entity is going to operate in a sleep mode (i.e., at least some components of the network entity, such as the DU, the RU, an antenna panel, an antenna sub-panel, etc., are deactivated). If the network entity knows (or can estimate) the amount of time needed to reactivate the cell, the network entity may indicate to the UE which capabilities can be deactivated and which capabilities should remain active. The network entity may make such determinations according to one or more UE capabilities and the expected time needed to deactivate and/or reactivate the cell. The UE capabilities may be transmitted from the UE and provided to the network entity. In some aspects, the capabilities transmitted from the UE may indicate that the UE supports dynamic activation/deactivation of cells. In some aspects, the capabilities may further indicate one or more parameters concerning the capabilities such as expected switching time (e.g., from an activate state to a deactivated state or vice versa), supported network energy saving states, a combination thereof, and/or the like.

In some aspects, the deactivation information may include a DRX configuration for deactivation of the cell. In some aspects, the UE may receive an explicit or implicit indication to start the DRX operation for a given amount of time, such as for the amount of time the cell is off. The UE may be configured with multiple DRX configurations as well as a mapping between deactivation times and/or deactivation types and corresponding DRX configurations. When the network signals a deactivation time or deactivation type, the UE may start the DRX operation with the corresponding DRX configuration, as discussed in greater detail below. A DRX configuration may include one or more parameters relating to DRX, such as a periodicity, an on duration, a length of the DRX operation (e.g., the given amount of time), a resource for the DRX operation, or the like.

In some aspects, the deactivation information may be provided in a configuration of a cell. For example, the deactivation information may be provided to the UE via an RRC configuration. In such situations, each cell may be configured with a switching time and/or type. The "switching time and/or type" may refer to or indicate the deactivation time, the deactivation type, a reactivation time, a reactivation type, a combination thereof, and/or the like. The UE may determine the switching time and/or type for a cell from the RRC configuration upon receipt of a deactivation signal indicating to activate or deactivate the cell, discussed below. If the RRC configuration is missing, the UE may assume that the deactivation or reactivation is permanent.

As shown by reference number 610, the UE may be configured for cell deactivation. In some aspects, the UE may be configured for cell deactivation according to the deactivation information received. In some aspects, the UE may configure (e.g., deactivate, activate, switch to a network energy saving state) one or more cells according to the deactivation information.

As shown by reference number 615, the network entity may output, and the UE may receive, deactivation signaling. The deactivation signaling may instruct the UE to deactivate one or more cells in accordance with the deactivation information. In some aspects, such as where the time configuration indicates the time at which the cell is to be deactivated, the UE may deactivate the cell without explicit deactivation signaling at 615. In some aspects, the deactivation information at 605, or the receipt of the deactivation information at 605, may serve as the deactivation signal at 615. For example, as an alternative to RRC signaling, discussed above, the deactivation information may be provided via deactivation DCI. For instance, the deactivation DCI may include one or more bits or an invalid non-scheduling DCI combination mapping to an index in an RRC configured table (e.g., configured at 605) that provides the switching time and/or type.

As shown by reference number 620, the UE may deactivate the cell. The UE may deactivate the cell according to the deactivation information. In some aspects, the UE may deactivate the cell at a time indicated by the time configuration. In some aspects, the UE may deactivate the cell for a duration of time indicated by the time configuration. In some aspects, the UE may deactivate the cell according to the deactivation type. For example, the UE may deactivate the cell in accordance with a sleep mode (e.g., RF deactivation or baseband deactivation) or other deactivation mode indicated by the deactivation information. In some aspects, deactivating the cell in accordance with the sleep mode or other deactivation mode may include deactivating the cell for a predetermined amount of time, deactivating certain features (such as RF or baseband operations), and/or the like.

As shown by reference number 625, the UE may perform a DRX operation while the cell is deactivated. The DRX operation may include the UE operating in an idle or inactive mode, resulting in increased energy savings while the cell is deactivated. For example, the UE may monitor for a wake-up signal or paging directed to the UE (e.g., on a deactivated cell or a different cell). In some aspects, the DRX operation may begin after the cell is deactivated. In some aspects, the DRX operation may be completed before the cell is reactivated. In some aspects, the UE may perform the DRX operation for a given amount of time (e.g., indicated by the DRX configuration, an amount of time until the cell is reactivated, etc.).

As shown by reference number 630, the UE may reactivate the cell according to the deactivation information. In some aspects, the UE may reactivate the cell based at least in part on the time configuration. In some aspects, the time configuration may indicate a minimum amount of time that the cell is to be deactivated. In such aspects, the UE may reactivate the cell after the minimum amount of time has elapsed. In some aspects, the UE may reactivate the cell according to reactivation signaling output by the network entity. The reactivation signaling may configure the UE to reactivate one or more deactivated cells.

In some aspects, reactivating the cell may include updating one or more configuration parameters. For example, the UE may update an AGC parameter. Whether to update one or more of the configuration parameters may be based at least in part on the minimum amount of time that the cell is to be deactivated, or a length of time that the cell is deactivated. The likelihood that one or more of the configuration parameters will need to be updated may be proportional to the length of the minimum amount of time or the length of time. That is, a longer length of time may result in a greater chance that the UE will need to update one or more of the configuration parameters. As another example, if the minimum amount of time or the length of time satisfies a threshold, the UE may update a configuration parameter, and may not update a configuration parameter if the minimum amount of time or the length of time fails to satisfy the threshold.

In some aspects, the UE may reactivate the cell according to the deactivation type. As discussed above, the deactivation type may indicate a sleep mode and/or a deactivation mode. In such cases, reactivation of the cell may include the UE resuming certain operations on the cell, including RF operations and/or baseband operations.

As discussed above, with the time configuration, the deactivation type, and/or the DRX configuration, the UE can plan for the deactivation and reactivation of the cell. That is, the UE can determine whether to update certain configuration parameters based on the duration of the deactivation, the type of deactivation, and/or the like, and potentially avoid issues with amplifying noise, clipping received signals, and/or the like. Moreover, by communicating the time configuration, the deactivation type, and/or the DRX configuration to the UE, the network entity may increase the likelihood that the UE can facilitate the frequent deactivation and reactivation of the cell, thereby resulting in decreased energy consumption, without adversely affecting operation of the UE.

As indicated above, FIG. 6 is provided as an example. Other examples may differ from what is described with respect to FIG. 6.

Figure 7:
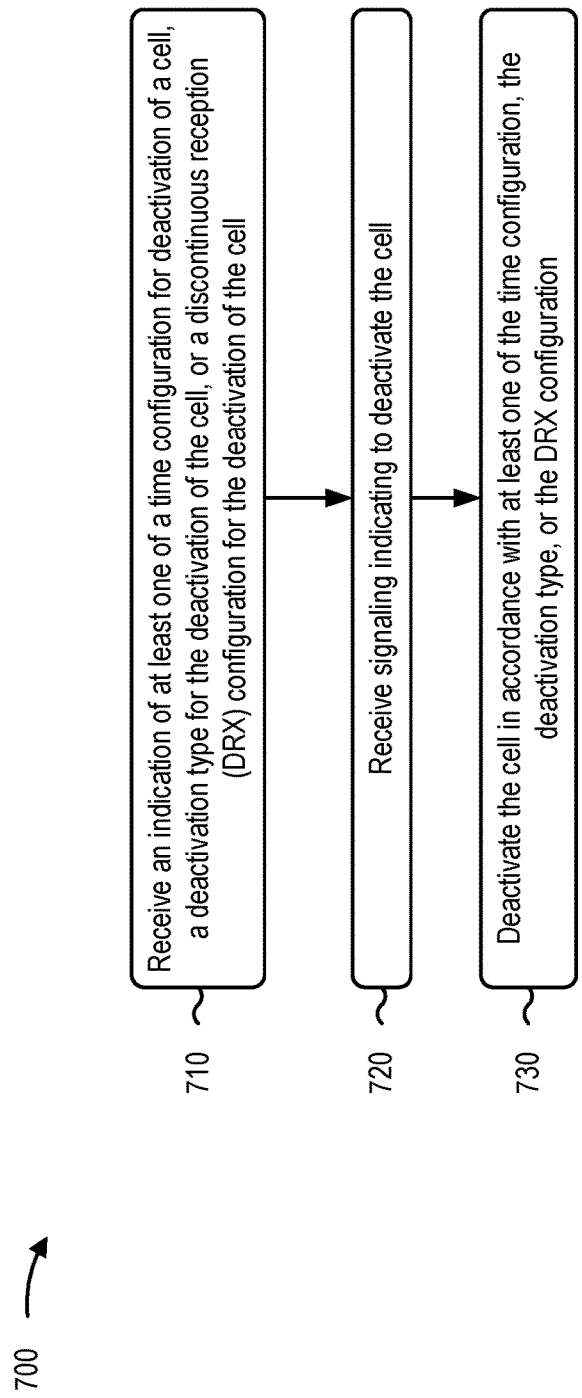
FIG. 7 shows a method for wireless communications by a UE, in accordance with the present disclosure.

FIG. 7 shows a method 700 for wireless communications by a UE, such as UE 120.

Method 700 begins at 710 with receiving an indication of at least one of: a time configuration for deactivation of a cell, a deactivation type for the deactivation of the cell, or a DRX configuration for the deactivation of the cell. For example, the UE (e.g., using transceiver 908, code 931, and/or circuitry 921, or any combination thereof, depicted in FIG. 9) may receive an indication of at least one of: a time configuration for deactivation of a cell, a deactivation type for the deactivation of the cell, or a DRX configuration for the deactivation of the cell, as described above.

Method 700 then proceeds to step 720 with receiving signaling indicating to deactivate the cell. For example, the UE (e.g., using transceiver 908, circuitry 922, and/or code 932, or any combination thereof, depicted in FIG. 9) may receive signaling indicating to deactivate the cell, as described above.

Method 700 then proceeds to step 730 with deactivating the cell in accordance with at least one of the time configuration, the deactivation type, or the DRX configuration. For example, the UE (e.g., using circuitry 923, and/or code 933, or any combination thereof, depicted in FIG. 9) may deactivate the cell in accordance with at least one of the time configuration, the deactivation type, or the DRX configuration, as described above.

In one aspect, method 700 further includes deactivating the cell in accordance with at least one of the time configuration, the deactivation type, or the DRX configuration.

In a first aspect, the indication is of the time configuration, and the time configuration indicates a time at which the cell is to be deactivated.

In a second aspect, alone or in combination with the first aspect, the indication is of the time configuration, and the time configuration defines at least a minimum amount of time that the cell is to be deactivated.

In a third aspect, alone or in combination with one or more of the first and second aspects, method 700 includes reactivating the cell after the minimum amount of time has elapsed.

In a fourth aspect, alone or in combination with one or more of the first through third aspects, method 700 includes updating an automatic gain control value prior to reactivating the cell.

In a fifth aspect, alone or in combination with one or more of the first through fourth aspects, method 700 includes updating an automatic gain control value if the minimum amount of time exceeds a predetermined threshold.

In a sixth aspect, alone or in combination with one or more of the first through fifth aspects, the indication is of the deactivation type, and the deactivation type includes at least one of an RF deactivation or a baseband deactivation.

In a seventh aspect, alone or in combination with one or more of the first through sixth aspects, the indication is of the deactivation type, wherein the deactivation type includes at least one of a sleep mode or a deactivation mode.

In an eighth aspect, alone or in combination with one or more of the first through seventh aspects, the indication is of the DRX configuration, and method 700 includes starting a DRX operation while the cell is deactivated.

In a ninth aspect, alone or in combination with one or more of the first through eighth aspects, the DRX configuration defines a time interval for the DRX operation, wherein the time interval is shorter than an amount of time that the cell is to be deactivated.

In a tenth aspect, alone or in combination with one or more of the first through ninth aspects, method 700 includes completing the DRX operation while the cell is deactivated.

In an eleventh aspect, alone or in combination with one or more of the first through tenth aspects, the indication is included in downlink control information.

In a twelfth aspect, alone or in combination with one or more of the first through eleventh aspects, the indication is included in radio resource control signaling.

Figure 9:
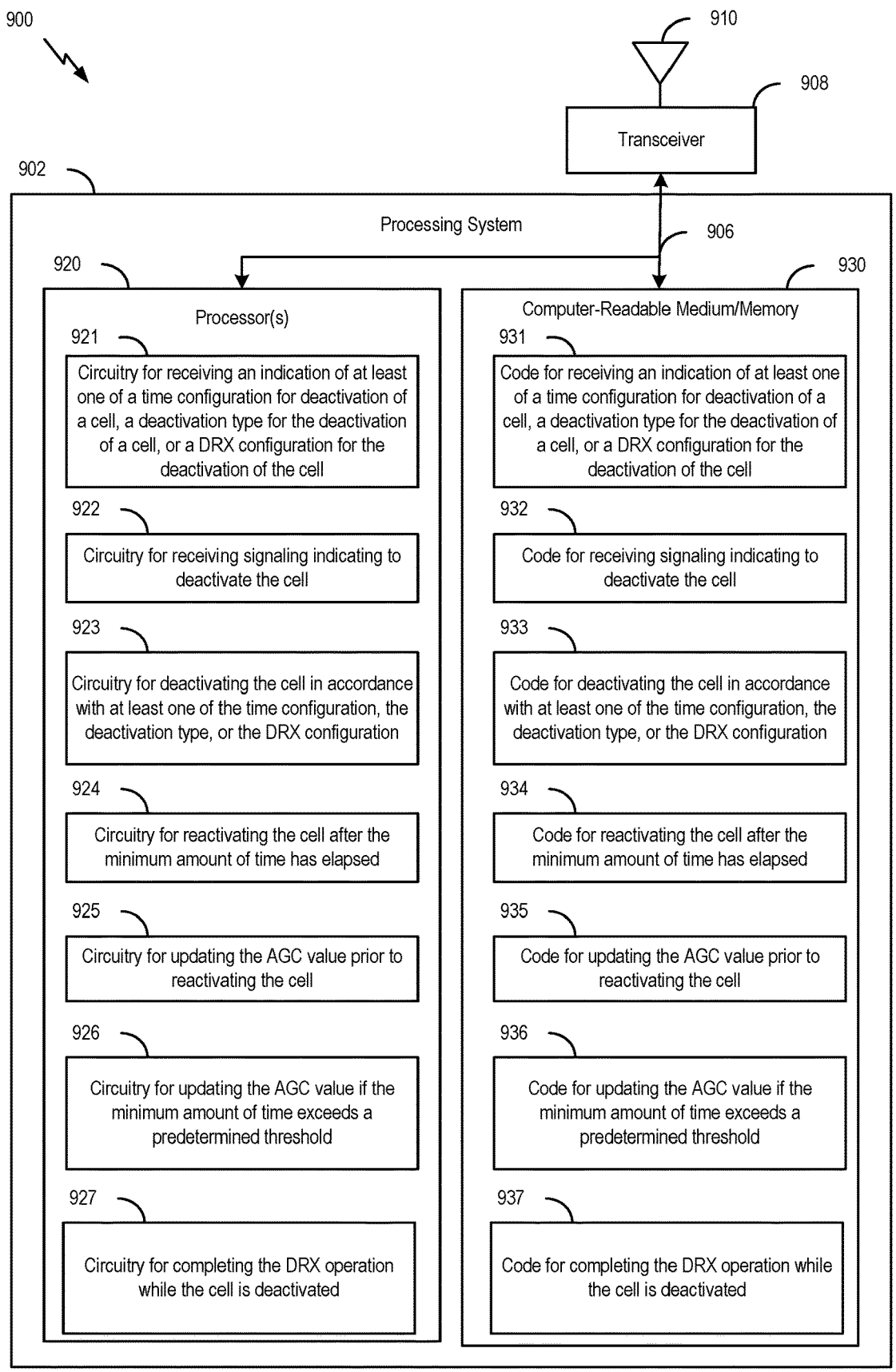
FIG. 9 depicts aspects of an example communications device, in accordance with the present disclosure.

In one aspect, method 700, or any aspect related to it, may be performed by an apparatus, such as communications device 900 of FIG. 9, which includes various components operable, configured, or adapted to perform the method 700. Communications device 900 is described below in further detail.

Note that FIG. 7 is just one example of a method, and other methods including fewer, additional, or alternative steps are possible consistent with this disclosure.

Figure 8:
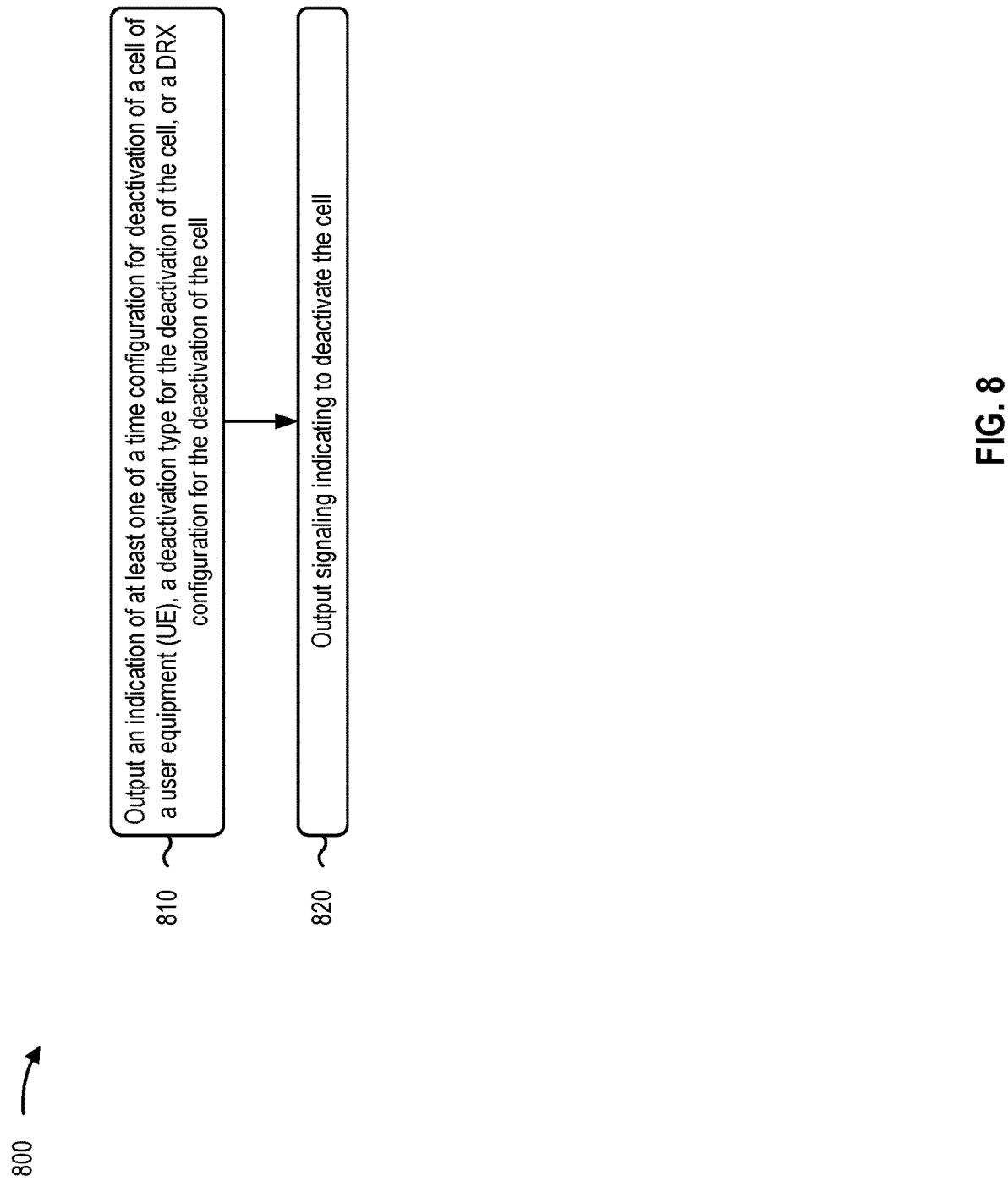
FIG. 8 shows a method for wireless communications by a network entity, in accordance with the present disclosure.

FIG. 8 shows a method 800 for wireless communications by a network entity, such as network node 110, or a disaggregated base station as discussed with respect to FIG. 3.

Method 800 begins at 810 with outputting an indication of at least one of: a time configuration for deactivation of a cell of a UE, a deactivation type for the deactivation of the cell, or a DRX configuration for the deactivation of the cell. For example, the network entity (e.g., using transceiver 1008, code 1031, circuitry 1021, or a combination thereof, depicted in FIG. 10) may output an indication of at least one of: a time configuration for deactivation of a cell of a UE, a deactivation type for the deactivation of the cell, or a DRX configuration for the deactivation of the cell, as described above.

Method 800 then proceeds to step 820 with outputting signaling indicating to deactivate the cell. For example, the network entity (e.g., using transceiver 1008, code 1031, circuitry 1021, or a combination thereof, depicted in FIG. 10) may output signaling indicating to deactivate the cell, as described above.

In a first aspect, the indication is of the time configuration, wherein the time configuration indicates a time at which the cell is to be deactivated.

In a second aspect, alone or in combination with the first aspect, the time configuration defines at least a minimum amount of time the cell is to be deactivated.

In a third aspect, alone or in combination with one or more of the first and second aspects, method 800 includes outputting signaling indicating to reactivate the cell after the minimum amount of time has elapsed.

In a fourth aspect, alone or in combination with one or more of the first through third aspects, the indication is of the deactivation type, wherein the deactivation type includes at least one of an RF deactivation or a baseband deactivation.

In a fifth aspect, alone or in combination with one or more of the first through fourth aspects, method 800 includes selecting the deactivation type based on a UE capability and an expected switching time.

In a sixth aspect, alone or in combination with one or more of the first through fifth aspects, the indication is of the deactivation type, wherein the deactivation type includes at least one of a sleep mode or a deactivation mode.

In a seventh aspect, alone or in combination with one or more of the first through sixth aspects, the indication is included in downlink control information.

In an eighth aspect, alone or in combination with one or more of the first through seventh aspects, the indication is included in radio resource control signaling.

Figure 10:
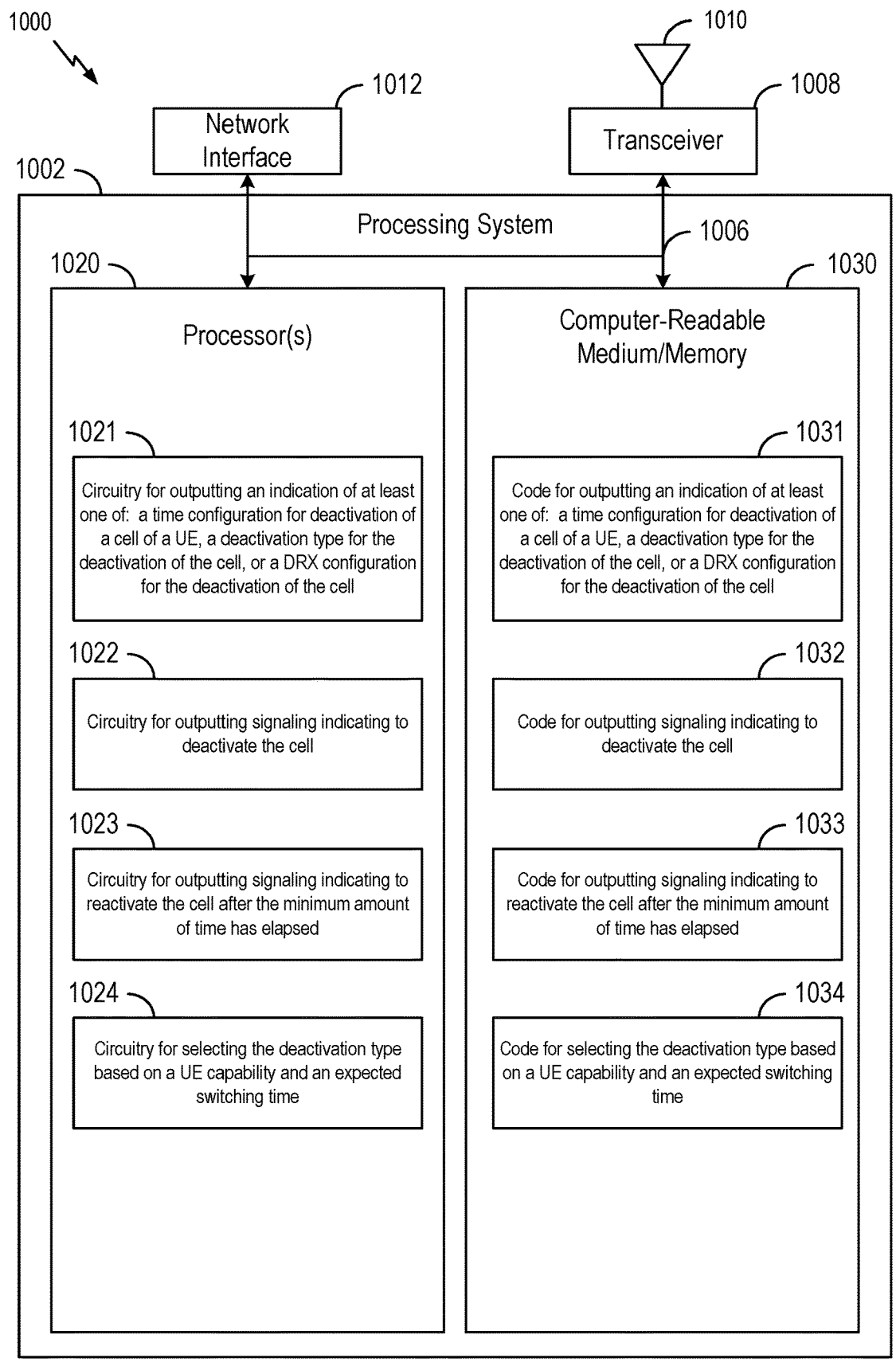
FIG. 10 depicts aspects of an example communications device, in accordance with the present disclosure.

In one aspect, method 800, or any aspect related to it, may be performed by an apparatus, such as communications device 1000 of FIG. 10, which includes various components operable, configured, or adapted to perform the method 800. Communications device 1000 is described below in further detail.

Note that FIG. 8 is just one example of a method, and other methods including fewer, additional, or alternative steps are possible consistent with this disclosure.

FIG. 9 depicts aspects of an example communications device 900. In some aspects, communications device 900 is a user equipment, such as UE 120.

The communications device 900 includes a processing system 902 coupled to a transceiver 908 (e.g., a transmitter and/or a receiver). The transceiver 908 is configured to transmit and receive signals for the communications device 900 via an antenna 910, such as the various signals as described herein. The processing system 902 may be configured to perform processing functions for the communications device 900, including processing signals received and/or to be transmitted by the communications device 900.

The processing system 902 includes one or more processors 920. In various aspects, the one or more processors 920 may be representative of one or more of receive processor 258, transmit processor 264, TX MIMO processor 266, and/or controller/processor 280, as described with respect to FIG. 2. The one or more processors 920 are coupled to a computer-readable medium/memory 930 via a bus 906. In certain aspects, the computer-readable medium/memory 930 is configured to store instructions (e.g., computer-executable code) that when executed by the one or more processors 920, cause the one or more processors 920 to perform the method 700 described with respect to FIG. 7, or any aspect related to it. Note that reference to a processor performing a function of communications device 900 may include one or more processors performing that function of communications device 900.

In the depicted example, computer-readable medium/memory 930 stores code (e.g., executable instructions) 931 for receiving an indication of at least one of a time configuration for deactivation of a cell, a deactivation type for the deactivation of a cell, or a DRX configuration for the deactivation of the cell, code 932 for receiving signaling indicating to deactivate the cell, code 933 for deactivating the cell in accordance with at least one of the time configuration, the deactivation type, or the DRX configuration, code 934 for reactivating the cell after the minimum amount of time has elapsed, code 935 for updating the AGC value prior to reactivating the cell, code 936 for updating the AGC value if the minimum amount of time exceeds a predetermined threshold, and code 937 for completing the DRX operation while the cell is deactivated. Processing of the code 931-937 may cause the communications device 900 to perform the method 700 described with respect to FIG. 7, or any aspect related to it.

The one or more processors 920 include circuitry configured to implement (e.g., execute) the code stored in the computer-readable medium/memory 930, including circuitry 921 for receiving an indication of at least one of a time configuration for deactivation of a cell, a deactivation type for the deactivation of a cell, or a DRX configuration for the deactivation of the cell, circuitry 922 for receiving signaling indicating to deactivate the cell, circuitry 923 for deactivating the cell in accordance with at least one of the time configuration, the deactivation type, or the DRX configuration, circuitry 924 for reactivating the cell after the minimum amount of time has elapsed, circuitry 925 for updating the AGC value prior to reactivating the cell, circuitry 926 for updating the AGC value if the minimum amount of time exceeds a predetermined threshold, and circuitry 927 for completing the DRX operation while the cell is deactivated. Processing with circuitry 921-927 may cause the communications device 900 to perform the method 700 described with respect to FIG. 7, or any aspect related to it.

Various components of the communications device 900 may provide means for performing the method 700 described with respect to FIG. 7, or any aspect related to it. For example, means for transmitting, sending, or outputting for transmission may include the transceivers 254 and/or antenna(s) 252 of the UE 120 and/or transceiver 908 and antenna 910 of the communications device 900 in FIG. 9. Means for receiving or obtaining may include the transceivers 254 and/or antenna(s) 252 of the UE 120 and/or transceiver 908 and antenna 910 of the communications device 900 in FIG. 9.

FIG. 10 depicts aspects of an example communications device. In some aspects, communications device 1000 is a network entity, such as BS 110, or a disaggregated base station as discussed with respect to FIG. 3.

The communications device 1000 includes a processing system 1002 coupled to a transceiver 1008 (e.g., a transmitter and/or a receiver) and/or a network interface 1012. The transceiver 1008 is configured to transmit and receive signals for the communications device 1000 via an antenna 1010, such as the various signals as described herein. The network interface 1012 is configured to obtain and send signals for the communications device 1000 via communications link(s), such as a backhaul link, midhaul link, and/or fronthaul link as described herein, such as with respect to FIG. 3. The processing system 1002 may be configured to perform processing functions for the communications device 1000, including processing signals received and/or to be transmitted by the communications device 1000.

The processing system 1002 includes one or more processors 1020. In various aspects, one or more processors 1020 may be representative of one or more of receive processor 238, transmit processor 220, TX MIMO processor 230, and/or controller/processor 240, as described with respect to FIG. 2. The one or more processors 1020 are coupled to a computer-readable medium/memory 1030 via a bus 1006. In certain aspects, the computer-readable medium/memory 1030 is configured to store instructions (e.g., computer-executable code) that when executed by the one or more processors 1020, cause the one or more processors 1020 to perform the method 800 described with respect to FIG. 8, or any aspect related to it. Note that reference to a processor of communications device 1000 performing a function may include one or more processors of communications device 1000 performing that function.

In the depicted example, the computer-readable medium/memory 1030 stores code 1031 (e.g., executable instructions) for outputting an indication of at least one of: a time configuration for deactivation of a cell of a UE, a deactivation type for the deactivation of the cell, or a DRX configuration for the deactivation of the cell, code 1032 for outputting signaling indicating to deactivate the cell, code 1033 for outputting signaling indicating to reactivate the cell after the minimum amount of time has elapsed, and code 1034 for selecting the deactivation type based on a UE capability and an expected switching time. Processing of the code 1031-1034 may cause the communications device 1000 to perform the method 800 described with respect to FIG. 8, or any aspect related to it.

The one or more processors 1020 include circuitry configured to implement (e.g., execute) the code stored in the computer-readable medium/memory 1030, including circuitry 1021 for outputting an indication of at least one of: a time configuration for deactivation of a cell of a UE, a deactivation type for the deactivation of the cell, or a DRX configuration for the deactivation of the cell, circuitry 1022 for outputting signaling indicating to deactivate the cell, circuitry 1023 for outputting signaling indicating to reactivate the cell after the minimum amount of time has elapsed, and circuitry 1024 for selecting the deactivation type based on a UE capability and an expected switching time. Processing with circuitry 1021-1024 may cause the communications device 1000 to perform the method 800 as described with respect to FIG. 8, or any aspect related to it.

Various components of the communications device 1000 may provide means for performing the method 800 as described with respect to FIG. 8, or any aspect related to it. Means for transmitting, sending, or outputting for transmission may include the transceivers 232 and/or antenna(s) 234 of the BS 110 and/or transceiver 1008 and antenna 1010 of the communications device 1000 in FIG. 10. Means for receiving or obtaining may include the transceivers 232 and/or antenna(s) 234 of the BS 110 and/or transceiver 1008 and antenna 1010 of the communications device 1000 in FIG. 10.

The following provides an overview of some Aspects of the present disclosure:

Aspect 1: A method of wireless communication performed by a UE, comprising: receiving an indication of at least one of: a time configuration for deactivation of a cell, a deactivation type for the deactivation of the cell, or a DRX configuration for the deactivation of the cell; receiving signaling indicating to deactivate the cell; and deactivating the cell in accordance with at least one of the time configuration, the deactivation type, or the DRX configuration.

Aspect 2: The method of Aspect 1, wherein the indication is of the time configuration, and wherein the time configuration indicates a time at which the cell is to be deactivated.

Aspect 3: The method of any of Aspects 1 or 2, wherein the indication is of the time configuration, and wherein the time configuration defines at least a minimum amount of time that the cell is to be deactivated.

Aspect 4: The method of Aspect 3, further comprising reactivating the cell after the minimum amount of time has elapsed.

Aspect 5: The method of any of Aspects 3 or 4, further comprising updating an automatic gain control value prior to reactivating the cell.

Aspect 6: The method of any of Aspects 3 or 4, further comprising updating an automatic gain control value if the minimum amount of time exceeds a predetermined threshold.

Aspect 7: The method of Aspect 1, wherein the indication is of the deactivation type, and wherein the deactivation type includes at least one of a radio frequency deactivation or a baseband deactivation.

Aspect 8: The method of any of Aspects 1, 6, or 7, wherein the indication is of the deactivation type, wherein the deactivation type includes at least one of a sleep mode or a deactivation mode.

Aspect 9: The method of Aspect 1, wherein the indication is of the DRX configuration, and wherein the method further comprises starting a DRX operation while the cell is deactivated.

Aspect 10: The method of Aspect 9, wherein the DRX configuration defines a time interval for the DRX operation, wherein the time interval is shorter than an amount of time that the cell is to be deactivated.

Aspect 11: The method of any of Aspects 9 or 10, further comprising completing the DRX operation while the cell is deactivated.

Aspect 12: The method of any of Aspect 1-11, wherein the indication is included in downlink control information.

Aspect 13: The method of any of Aspects 1-11, wherein the indication is included in radio resource control signaling.

Aspect 14: A method of wireless communication performed by a network entity, comprising: outputting an indication of at least one of: a time configuration for deactivation of a cell of a UE, a deactivation type for the deactivation of the cell, or a DRX configuration for the deactivation of the cell; and outputting signaling indicating to deactivate the cell.

Aspect 15: The method of Aspect 14, wherein the indication is of the time configuration, wherein the time configuration indicates a time at which the cell is to be deactivated.

Aspect 16: The method of any of Aspects 14-15, wherein the time configuration defines at least a minimum amount of time the cell is to be deactivated.

Aspect 17: The method of Aspect 16, further comprising outputting signaling indicating to reactivate the cell after the minimum amount of time has elapsed.

Aspect 18: The method of Aspect 14, wherein the indication is of the deactivation type, wherein the deactivation type includes at least one of a radio frequency deactivation or a baseband deactivation.

Aspect 19: The method of Aspect 18, further comprising selecting the deactivation type based on a UE capability and an expected switching time.

Aspect 20: The method of any of Aspects 14, 18, or 19, wherein the indication is of the deactivation type, wherein the deactivation type includes at least one of a sleep mode or a deactivation mode.

Aspect 21: The method of any of Aspects 14-20, wherein the indication is included in downlink control information.

Aspect 22: The method of any of Aspects 14-20, wherein the indication is included in radio resource control signaling.

Aspect 23: An apparatus for wireless communication at a device, comprising a processor; memory coupled with the processor; and instructions stored in the memory and executable by the processor to cause the apparatus to perform the method of one or more of Aspects 1-13.

Aspect 24: A device for wireless communication, comprising a memory and one or more processors coupled to the memory, the one or more processors configured to perform the method of one or more of Aspects 1-13.

Aspect 25: An apparatus for wireless communication, comprising at least one means for performing the method of one or more of Aspects 1-13.

Aspect 26: A non-transitory computer-readable medium storing code for wireless communication, the code comprising instructions executable by a processor to perform the method of one or more of Aspects 1-13.

Aspect 27: A non-transitory computer-readable medium storing a set of instructions for wireless communication, the set of instructions comprising one or more instructions that, when executed by one or more processors of a device, cause the device to perform the method of one or more of Aspects 1-13.

Aspect 28: An apparatus for wireless communication at a device, comprising a processor; memory coupled with the processor; and instructions stored in the memory and executable by the processor to cause the apparatus to perform the method of one or more of Aspects 14-22.

Aspect 29: A device for wireless communication, comprising a memory and one or more processors coupled to the memory, the one or more processors configured to perform the method of one or more of Aspects 14-22.

Aspect 30: An apparatus for wireless communication, comprising at least one means for performing the method of one or more of Aspects 14-22.

Aspect 31: A non-transitory computer-readable medium storing code for wireless communication, the code comprising instructions executable by a processor to perform the method of one or more of Aspects 14-22.

Aspect 32: A non-transitory computer-readable medium storing a set of instructions for wireless communication, the set of instructions comprising one or more instructions that, when executed by one or more processors of a device, cause the device to perform the method of one or more of Aspects 14-22.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the general principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various actions may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The various illustrative logical blocks, modules, and circuits described in connection with the present disclosure may be implemented or performed with a general purpose processor, a digital signal processor (DSP), an application-specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices (e.g., a combination of a DSP and a microprocessor, a plurality of microprocessors, one or more microprocessors in conjunction with a DSP core, a system on a chip (SoC), or any other such configuration).

As used herein, the term "determining" encompasses a wide variety of actions. For example, "determining" may include calculating, computing, processing, deriving, investigating, looking up (e.g., looking up in a table, a database, or another data structure), ascertaining, and the like. Also, "determining" may include receiving (e.g., receiving information), accessing (e.g., accessing data in a memory), and the like. Also, "determining" may include resolving, selecting, choosing, establishing, and the like.

The methods disclosed herein comprise one or more actions for achieving the methods. The method actions may be interchanged with one another without departing from the scope of the claims. In other words, unless a specific order of actions is specified, the order and/or use of specific actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for". All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method of wireless communication performed by a user equipment (UE), comprising:
    receiving an indication of a time configuration for deactivation of a cell, wherein the time configuration defines at least a minimum amount of time that the cell is to be deactivated;
    receiving signaling indicating to deactivate the cell;
    deactivating the cell in accordance with the time configuration; and
    updating an automatic gain control value either: (i) prior to reactivating the cell, or (ii) if the minimum amount of time exceeds a predetermined threshold.

2. The method of claim 1, further comprising reactivating the cell after the minimum amount of time has elapsed.

3. The method of claim 1, wherein updating the automatic gain control value comprises updating the automatic gain control value prior to reactivating the cell.

4. The method of claim 1, wherein updating the automatic gain control value comprises updating the automatic gain control value if the minimum amount of time exceeds a predetermined threshold.

5. The method of claim 1, comprising: receiving deactivation information that includes a deactivation type for the deactivation of the cell, wherein the deactivation type includes a baseband deactivation, wherein the deactivation of the cell is in accordance with the deactivation information, and wherein the deactivation type includes a radio frequency deactivation.

6. The method of claim 1, comprising: receiving deactivation information that includes a deactivation type for the deactivation of the cell, wherein the deactivation type includes a baseband deactivation, wherein the deactivation of the cell is in accordance with the deactivation information, and wherein the deactivation type includes at least one of a sleep mode or a deactivation mode.

7. The method of claim 1, comprising: receiving deactivation information that includes a deactivation type for the deactivation of the cell, wherein the deactivation type includes a baseband deactivation, wherein the deactivation of the cell is in accordance with the deactivation information, and wherein the deactivation information includes a discontinuous reception (DRX) configuration for the deactivation of the cell, and wherein the method further comprises starting a DRX operation while the cell is deactivated.

8. The method of claim 7, wherein the DRX configuration defines a time interval for the DRX operation, wherein the time interval is shorter than an amount of time that the cell is to be deactivated.

9. The method of claim 7, further comprising completing the DRX operation while the cell is deactivated.

10. The method of claim 1, comprising: receiving deactivation information that includes a deactivation type for the deactivation of the cell, wherein the deactivation type includes a baseband deactivation, wherein the deactivation of the cell is in accordance with the deactivation information, and wherein the deactivation information is included in one or more of downlink control information or radio resource control signaling.

11. A user equipment (UE) configured for wireless communications, comprising:
    a memory; and
    one or more processors coupled to the memory, the one or more processors configured to cause the UE to:
        receive an indication of a time configuration for deactivation of a cell, wherein the time configuration defines at least a minimum amount of time that the cell is to be deactivated;
        receive signaling indicating to deactivate the cell;
        deactivate the cell in accordance with the time configuration; and
        update an automatic gain control value either: (i) prior to reactivating the cell or (ii) if the minimum amount of time exceeds a predetermined threshold.

12. The UE of claim 11, wherein the one or more processors are configured to cause the UE to reactivate the cell after the minimum amount of time has elapsed.

13. The UE of claim 11, wherein to cause the UE to update the automatic gain control value, the one or more processors configured to cause the UE to update the automatic gain control value prior to reactivating the cell.

14. The UE of claim 11, wherein to cause the UE to update the automatic gain control value, the one or more processors configured to cause the UE to update the automatic gain control value if the minimum amount of time exceeds a predetermined threshold.

15. The UE of claim 11, wherein the one or more processors are configured to cause the UE to receive deactivation information that includes a deactivation type for the deactivation of the cell, wherein the deactivation type includes a baseband deactivation, wherein the deactivation of the cell is in accordance with the deactivation information, and wherein the deactivation type includes a radio frequency deactivation.

16. The UE of claim 11, wherein the one or more processors are configured to cause the UE to receive deactivation information that includes a deactivation type for the deactivation of the cell, wherein the deactivation type includes a baseband deactivation, wherein the deactivation of the cell is in accordance with the deactivation information, and wherein the deactivation type includes at least one of a sleep mode or a deactivation mode.

17. The UE of claim 11, wherein the one or more processors are configured to cause the UE to receive deactivation information that includes a deactivation type for the deactivation of the cell, wherein the deactivation type includes a baseband deactivation, wherein the deactivation of the cell is in accordance with the deactivation information, and wherein the deactivation information includes a discontinuous reception (DRX) configuration for the deactivation of the cell, and wherein the one or more processors are configured to cause the UE to start a DRX operation while the cell is deactivated.

18. The UE of claim 17, wherein the DRX configuration defines a time interval for the DRX operation, wherein the time interval is shorter than an amount of time that the cell is to be deactivated.

19. The UE of claim 17, further comprising completing the DRX operation while the cell is deactivated.

20. The UE of claim 11, wherein the one or more processors are configured to cause the UE to receive deactivation information that includes a deactivation type for deactivation of a cell, wherein the deactivation type includes a baseband deactivation, wherein deactivation of the cell is in accordance with the deactivation information, and wherein the deactivation information is included in one or more of downlink control information or radio resource control signaling.

* * * * *